United States Patent
Jeong et al.

(10) Patent No.: US 9,609,496 B2
(45) Date of Patent: Mar. 28, 2017

(54) DATA ACQUISITION METHOD AND APPARATUS FOR WIRELESS COMMUNICATION SYSTEM

(71) Applicant: Samsung Electronics Co. Ltd., Suwon-si, Gyeonggi-do (KR)

(72) Inventors: Sangsoo Jeong, Suwon-si (KR); Hanna Lim, Seoul (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 13/675,305

(22) Filed: Nov. 13, 2012

(65) Prior Publication Data

US 2013/0121213 A1 May 16, 2013

Related U.S. Application Data

(60) Provisional application No. 61/558,967, filed on Nov. 11, 2011.

(51) Int. Cl.
*H04W 4/22* (2009.01)
*H04L 29/06* (2006.01)
*H04W 4/00* (2009.01)

(52) U.S. Cl.
CPC .......... *H04W 4/22* (2013.01); *H04L 65/1016* (2013.01); *H04L 65/1069* (2013.01); *H04L 65/1096* (2013.01); *H04W 4/001* (2013.01)

(58) Field of Classification Search
None
See application file for complete search history.

(56) References Cited

U.S. PATENT DOCUMENTS

2011/0138380 A1* 6/2011 Sharaga ................. 717/178
2012/0237002 A1* 9/2012 Sennett ............ H04W 4/12
379/45

(Continued)

OTHER PUBLICATIONS

3GPP TS 24.229 V9.4.0 (Jun. 2010), 3rd Generation Partnership Project; Technical Specification Group Core Network and Terminals; IP multimedia call control protocol based on Session Initiation Protocol (SIP) and Session Description Protocol (SDP); Stage 3 (Release 9), Internet retrieved <URL: http://www.quintillion.co.jp/3GPP/Specs/24229-940.pdf>, Jun. 2010.

(Continued)

*Primary Examiner* — Ayaz Sheikh
*Assistant Examiner* — Sori Aga
(74) *Attorney, Agent, or Firm* — Jefferson IP Law, LLP (57) ABSTRACT

A method and a terminal for acquiring information on the media supported by an emergency center to provide the terminal with the emergency call service using non-voice media as well voice media are provided. A method includes receiving information on media supported by an Internet Protocol (IP) Multimedia Subsystem (IMS) from a server, storing the information on the media supported by the IMS, and transmitting a signal to a Public Safety Answering Point (PSAP) based on the information on the media supported by the IMS and the terminal. The emergency call processing method of the present invention allows only the terminal capable of NOVES to perform the media information acquisition procedure, thereby avoiding overhead caused by media acquisition attempts of a large number of terminal.

17 Claims, 8 Drawing Sheets

(56) References Cited

U.S. PATENT DOCUMENTS

2012/0276865 A1* 11/2012 Wang et al. ............... 455/404.2
2012/0309341 A1* 12/2012 Ward ........................ 455/404.2

OTHER PUBLICATIONS

Action by the Commission, Dec. 21, 2010, by NOI (FCC 10-200), Internet retrieved <URL: https://mentor.ieee.org/802.23/dcn/11/23/11/0004-00-ESWGwg-comments-on-fcc-noi.pdf >, Dec. 21, 2010.
Randall Gellens, ATIS/3GPPCommon IMS Emergency Calling, The EU Emergency Services Workshop, Apr. 13, 2011.
"3rd Generation Partnership Project; Technical Specification Group Services and System Aspects; Service aspects; Service principles (Release 11)", 3GPP Standard, 3GPP TS 22.101, 3rd Generation Partnership Project (3GPP), Sep. 30, 2011, pp. 1-64, XP050554250, vol. SA WG1, No. V11.3.0, Mobile Competence Centre, Sophia-Antipolis Cedex, France.
Nokia Siemens Networks, TSG SA WG2: "[Draft] LS on request for clarification of IMS emergency calls with other media", 3GPP Draft, S2-114646, LS-TO-SA1-NOVES, 3rd Generation Partnership Project (3GPP), Oct. 10-14, 2011, vol. SA WG2, XP050549764, Jeju Island, Republic of Korea.
Nokia Siemens Networks: "Noves Requirements", 3GPP Draft; S2-114067_9.4_7.5.5_P-CR_NOVES_REQUIREMENTS,3rd Generation Partnership Project (3GPP), Oct. 10-14, 2011, vol. SA WG2, XP050549252, Jeju Island, Republic of Korea.

* cited by examiner

DATA ACQUISITION METHOD AND APPARATUS FOR WIRELESS COMMUNICATION SYSTEM

CROSS-REFERENCE TO RELATED APPLICATIONS

This application claims the benefit under 35 U.S.C. §119 (e) of a U.S. Provisional patent application filed on Nov. 11, 2011 in the United States Intellectual Property Office and assigned Ser. No. 61/558,967, the entire disclosure of which is hereby incorporated by reference.

BACKGROUND OF THE INVENTION

1. Field of the Invention

The present invention relates to a wireless communication system. More particularly, the present invention relates to a method and a terminal for acquiring information on media supported by an emergency center to provide the terminal with the emergency call service using non-voice media as well voice media.

2. Description of the Related Art

Typically, an emergency call is a voice call for emergency services provided in a mobile communication system according to the related art. With the advance of packet data networks and the widespread use of smartphones, however, it has become increasingly necessary to provide a Non Voice Emergency Service (NOVES) as well as a voice emergency service. For example, the need for a NOVES may arise because a person in an emergency situation may want to report the emergency situation to an emergency center with a picture and/or a text, particularly when voice call service is not allowed. When the user tries to place a NOVES call, the terminal may exchange the information on the supportable media with the emergency center in an emergency session establishment procedure. In an exemplary case of IMS network, the terminal performs a media negotiation in the emergency session establishment procedure with a Public Safety Answering Point (PSAP) to determine whether the PSAP accepts the media requested by the terminal and presents the determined result to the user of the terminal. In this case, the negation result relates to only the media that the user has recommended, it is impossible for the User Equipment (UE) to know which other media are supported by the PSAP with the exception of the media accepted by the PSAP. There is therefore a need of a method for the terminal to acquire the information on the media types available in communication between the terminal and the PASP. For example, there is a need for a method and apparatus for acquiring the information as to types of media supported by the PSAP and that may be communicated between a terminal and the PASP.

Therefore, a need exists for a system and method for a method and a terminal that is capable of acquiring information on the media supported by the PSAP to which the terminal has connected to attempt to place a NOVES call.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and a terminal for acquiring information on media supported by an emergency center to provide the terminal with the emergency call service using non-voice media as well voice media.

The present invention has been made in an effort to solve the above problem and it is an object of the present invention to provide a method and a terminal that is capable of acquiring information on the media supported by the Public Safety Answering Point (PSAP) to which the terminal has connected to attempt to place a Non Voice Emergency Service (NOVES) call.

In accordance with an aspect of the present invention, a method for transmitting an emergency call of a terminal is provided. The method includes receiving information on media supported by an Internet Protocol (IP) Multimedia Subsystem (IMS) from a server, storing the information on the media supported by the IMS, transmitting a signal to a PSAP based on the information on the media supported by the IMS and the terminal.

In accordance with another aspect of the present invention, a terminal for transmitting an emergency call is provided. The terminal includes a transceiver which receives information on media supported by an IP Multimedia Subsystem (IMS) from a server, a storage unit which stores the information on the media supported by the IMS, and a control unit which controls the transceiver to transmit a signal to a Public Safety Answering Point (PSAP) based on the information on the media supported by the IMS and the terminal.

In accordance with an aspect of the present invention, a method for transmitting an emergency call of a terminal is provided. The method includes receiving, by the terminal, information from a server, determining, by the terminal, based on the information received from the server, whether a non-voice media type is supported for emergency calls, and transmitting, by the terminal, the emergency call using a non-voice media type if it is determined that non-voice media types are supported for emergency calls.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

The same reference numerals are used to represent the same elements throughout the drawings.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

For the same reason, some of elements are exaggerated, omitted or simplified in the drawings and the elements may have sizes and/or shapes different from those shown in drawings, in practice. The same reference numbers are used throughout the drawings to refer to the same or like parts. Exemplary embodiments of the present invention are described with reference to the accompanying drawings in detail. The description is made only with the operations necessary in the exemplary embodiments of the present invention, and other parts that may cause obscurity of the subject matter of the present invention are omitted.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to the 3rd Generation Partnership Project Long Term Evolution (3GPP LTE) system, exemplary embodiments of the present invention can be applied to other communication/computer systems having the similar technical background and system architecture with a slight modification without departing from the spirit and scope of the invention.

Figure 1:
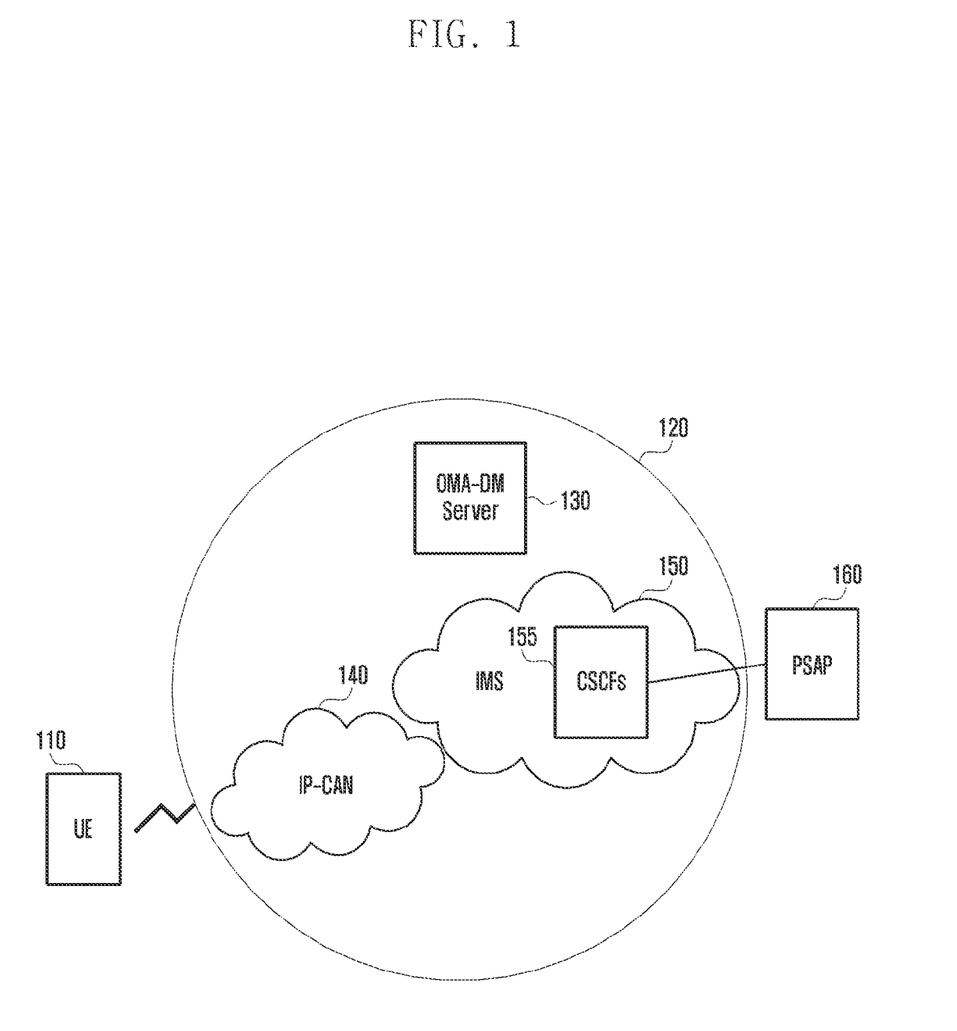
FIG. 1 is a schematic diagram illustrating a network according to an exemplary embodiment of the present invention.

FIG. 1 is a schematic diagram illustrating a network according to an exemplary embodiment of the present invention.

In FIG. 1, the User Equipment (UE) 110 is a terminal for a user to access a communication network. Hereinafter, the UE 100 is interchangeably referred to as "terminal."

The Internet Protocol—Connectivity Access Network (IP-CAN) 140 is a network to which the UE 110 connects for the access to an IMS network. The IP-CAN 140 can be an Evolved Packet System (EPS) bearer in EPS/LTE and Packet Data Protocol (PDP) context network or Wireless Local Area Network (WLAN) in Universal Mobile Telecommunication System (UMTS). The UE 110 is capable of connecting to the IMS network via the IP-CAN 140.

The IP Multimedia Subsystem (IMS) 150 is of the server providing IP-based multimedia service including voice, data, and video services; and the UE 110 is capable of accessing the Public Safety Answering Point (PSAP) 160 via the IP-CAN 140 and IMS 150. The IMS 150 is capable of including Call Session Control Functions (CSCFs) 155.

The CSCFs 155 is an entity of the IMS 150 network and delivers the emergency call requested by the UE 110 to the PSAP 160 as an emergency center.

The PSAP 160 can be the emergency center as a public safety answering point. The PSAP 160 is the end point at which the emergency call transmitted by the UE 110 arrives.

The Open Mobile Alliance-Device Management (OMA-DM) is a device management technique developed by Open Mobile Alliance (OMA). A service provider is capable of providing the terminal 110 with provisioning, device configuration, software upgrade, and fault management services using the OMA-DM. The UE 110 stores Management Objects (MOs) for the aforementioned purpose and is capable of exchanging the related information with the OMA-DM server 130. Although expressed as OMA-MD 130 in the exemplary embodiment of the present invention, it is also possible for the UE 110 to exchange MO-related information with other servers.

In an exemplary embodiment of the present invention, the OMA-DM server 130, the IP-CAN 140, and the IMS 150 can be referred as a service network 120 integrally.

Each of the UE 110, the OMA-DM server 130, the IP-CAN 140, and the IMS 150 is capable of including a transceiver for communicating data with another network entity, a storage unit for storing the data, and a control unit for controlling operation to be applied to the data. The UE 110 is also capable of including a display unit for displaying information to the user.

The UE 110 in communication with the IMS 150 is capable of storing the IMS MO, and the service provider is capable of controlling the IMS stored in the UE 110 via the OMA-DM server 130.

In an exemplary embodiment of the present invention the NOVES call can be a call including another media in addition to or other than voice. The another media may include at least one of video and text.

In an exemplary embodiment of the present invention, the UE 110 is capable of requesting the PSAP 160 for a first emergency session with the information including the type of media supported by the UE 110 before emergency session establishment with the PSAP using the user-requested media. The UE 110 is capable of acquiring the information on the media supported by the recipient based on the response to the first emergency session request.

In more detail, if the user places a NOVES call with the UE 110, the UE 110 attempts the first emergency session request with all types of media it supports before the emergency session establishment through the media requested by the user.

The UE 110 is capable of acquiring the information on the media supported by the PSAP 160 through emergency media negotiation with at least one of the IMS 150 and PSAP 160. The UE 110 is capable of displaying the information on the media supported by the PSAP 160 to the user. According to an exemplary embodiment of the present invention, the user is capable of selecting the media for use in placing an emergency call based on the media information displayed. At this time the user may reselect the previously requested media or change for or add other media. The UE 110 is capable of transmitting a second emergency request using the requested media. In this exemplary embodiment of the present invention, the user utilizing only the voice emergency call other than the NOVES transmits the second emergency session request after acquiring the information on the media available in response to the first emergency session request.

In another exemplary embodiment of the present invention, the information related to the first emergency session request which is controlled by the service provider can be stored in order to allow for only the UEs that have performed the NOVES to attempt the first emergency session request.

In the method according to such an exemplary embodiment of the present invention, a NOVES MO configurable by the service provider operating the service network can be stored in the UE 110. If the NOVES MO is set to a value of a preconfigured value, the UE 110 is capable of performing the first emergency session request.

According to an exemplary embodiment of the present invention, the method and apparatus is capable of preconfiguring the media type usable when the UE 110 establishes the emergency call with the IMS MO (e.g., at least one selected among the media types such as voice, video, text, and the like).

Although the description is directed to the emergency call establishment for the simplification purpose, the subject matter of the exemplary embodiments of the present invention is applicable to notify of the media type for use in normal voice and data call establishments. For example, the service provider or operator of the network can configure the media type available for the UE 110 in connection establishment for normal call as well as emergency call using the IMS MO, the media type being selected among several media types including voice. The configuration information can be stored in the UE 110.

Figure 2:
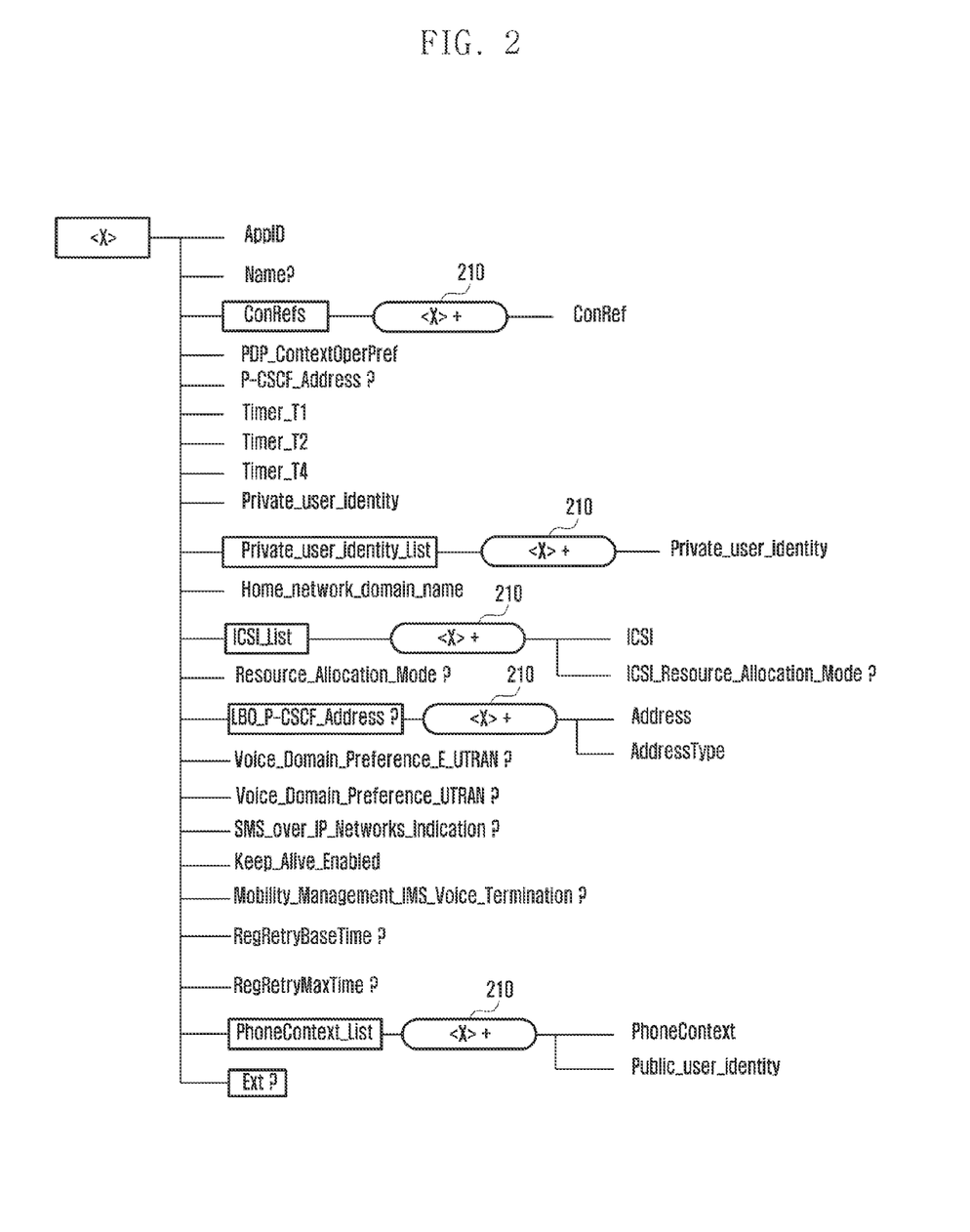
FIG. 2 is a diagram illustrating an architecture of an Internet Protocol (IP) Multimedia Subsystem (IMS) Management Object (MO) stored in a User Equipment (UE) according to an exemplary embodiment of the present invention.

FIG. 2 is a diagram illustrating an architecture of IMS MO stored in an UE according to an exemplary embodiment of the present invention.

Referring to FIG. 2, <X> 210 is a leaf node including information on the sub-nodes or a placeholder containing information on another <X>.

According to an exemplary embodiment of the present invention, the UE 110 is capable of storing the information related to the NOVES in the IMS MO. The UE 110 is capable of including the information on whether other media is available for emergency call as well as the voice and, if so, which media are available in the IMS MO.

The service provider is capable of configuring the NOVES information in the IMS MO of the UE 110 through the OMA-DM server 130. Although this exemplary embodiment of the present invention is directed to the case in which the OMA-DM server 130 is the configuration host, the NOVES information included in the IMS MO of the UE can be configured by other servers depending on the exemplary embodiment of the present invention.

The operator of the service network 120 is capable of determining whether the UE 110 has NOVES capability. Depending on the configuration, when the user places a NOVES call, the UE 110 capable of NOVES attempts the first emergency session establishment with all media it supports including voice. The UE 110 performs the legacy IMS media negotiation with the connected PSAP 160 through the first emergency session establishment procedure to acquire the information on the media supported by the PSAP 160. The supportable media information may change depending on the configuration of the PSAP 160 or IMS 150. The UE 110 is capable of displaying the acquired media information to the user. The user may change the media for another or add a media. The UE 110 performs the emergency call request with the supported media. The UE 110 is also capable of performing the emergency call request with the user-requested media immediately after acquiring the information on the media supported by the PSAP 160. This can be determined according to the serving network operator configuration or UE configuration.

According to an exemplary embodiment of the present invention, the method for placing a NOVES call is capable of including a step for determining whether the IMS MO includes the information on whether the UE 110 supports non-voice media types other than the voice media type for emergency call or whether the UE 110 supports only the voice media type for emergency call.

Figure 3:
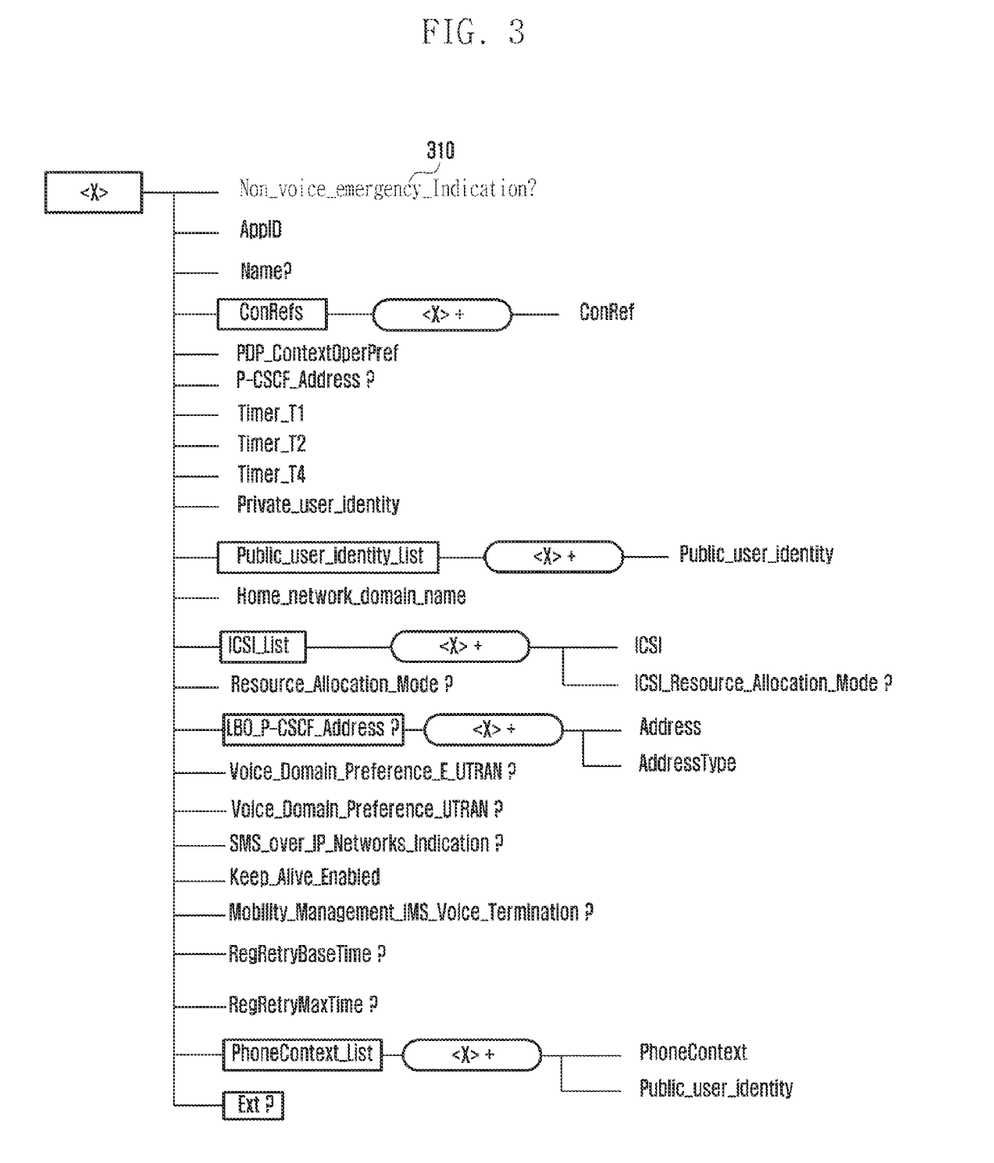
FIG. 3 is a diagram illustrating an architecture of an IMS MO including a leaf indicating an UE capability of a non-voice media type emergency call according to an exemplary embodiment of the present invention.

FIG. 3 is a diagram illustrating an architecture of an IMS MO including a leaf indicating an UE capability of a non-voice media type emergency call according to an exemplary embodiment of the present invention.

Although the leaf indicating the UE capability of non-voice media type emergency call is referred to as Non_voice_emergency_indication 310 in the exemplary embodiment of FIG. 3 of the present invention, it can be also called a different name depending on the exemplary embodiment of the present invention. The UE 110 is capable of determining whether it supports non-voice media type for emergency call based on the Non_voice_emergency_indication value.

Figure 4:
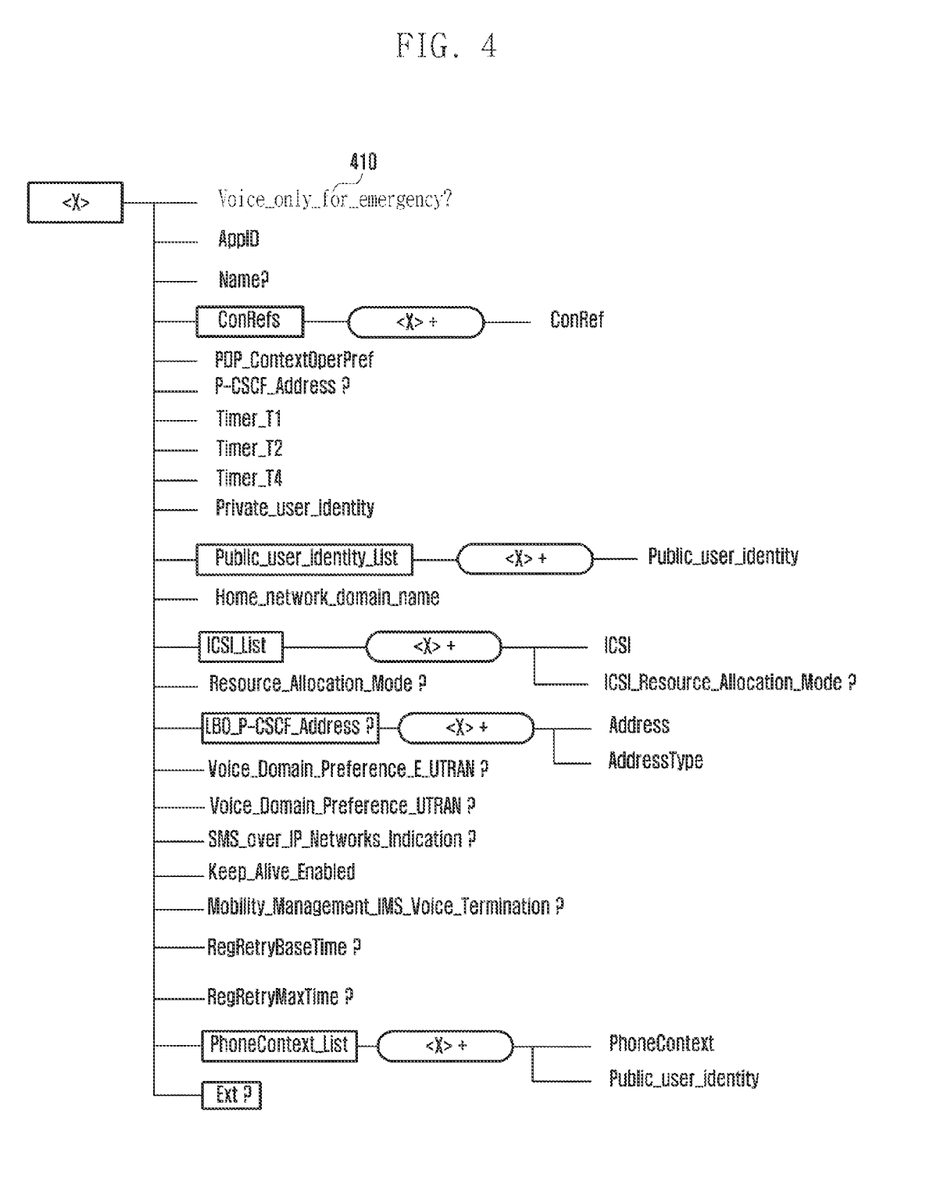
FIG. 4 is a diagram illustrating an architecture of an IMS MO including a leaf indicating an UE capability of only a voice media type emergency call according to an exemplary embodiment of the present invention.

FIG. 4 is a diagram illustrating an architecture of an IMS MO including a leaf indicating an UE capability of only a voice media type emergency call according to an exemplary embodiment of the present invention.

Although the leaf indicating the UE capability of voice media type only emergency call is referred to as Voice_only_for_emergency 410 in the exemplary embodiment of FIG. 4 of the present invention, in can be also called a different name depending on the exemplary embodiment of the present invention. The UE 110 is capable of determining whether it supports only the voice media type for emergency call based on the Voice_only_for_emergency value.

Figure 5:
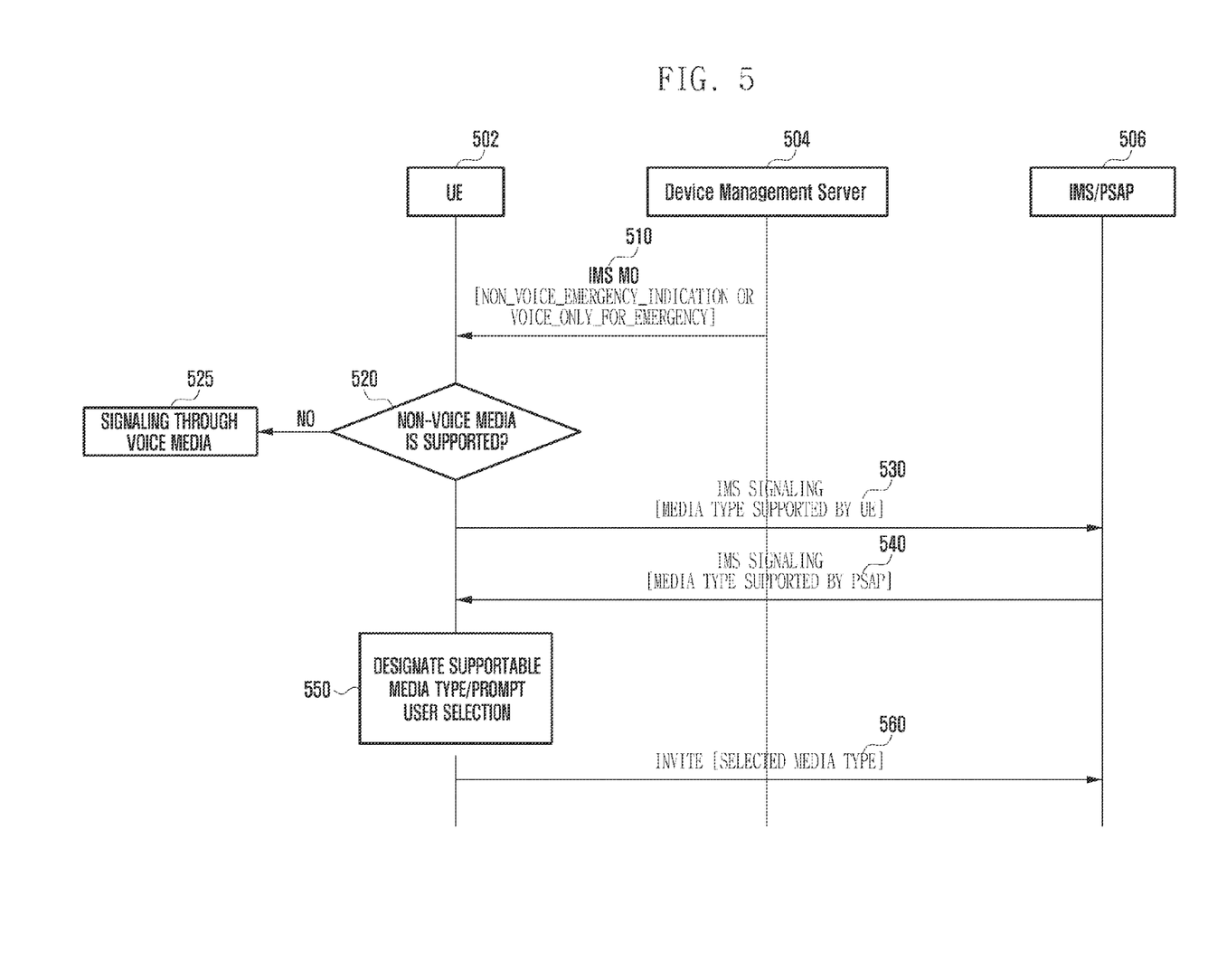
FIG. 5 is a signal flow diagram illustrating a procedure for processing a NOVES call of an UE supporting non-voice media type according to an exemplary embodiment of the present invention.
Figure 6:
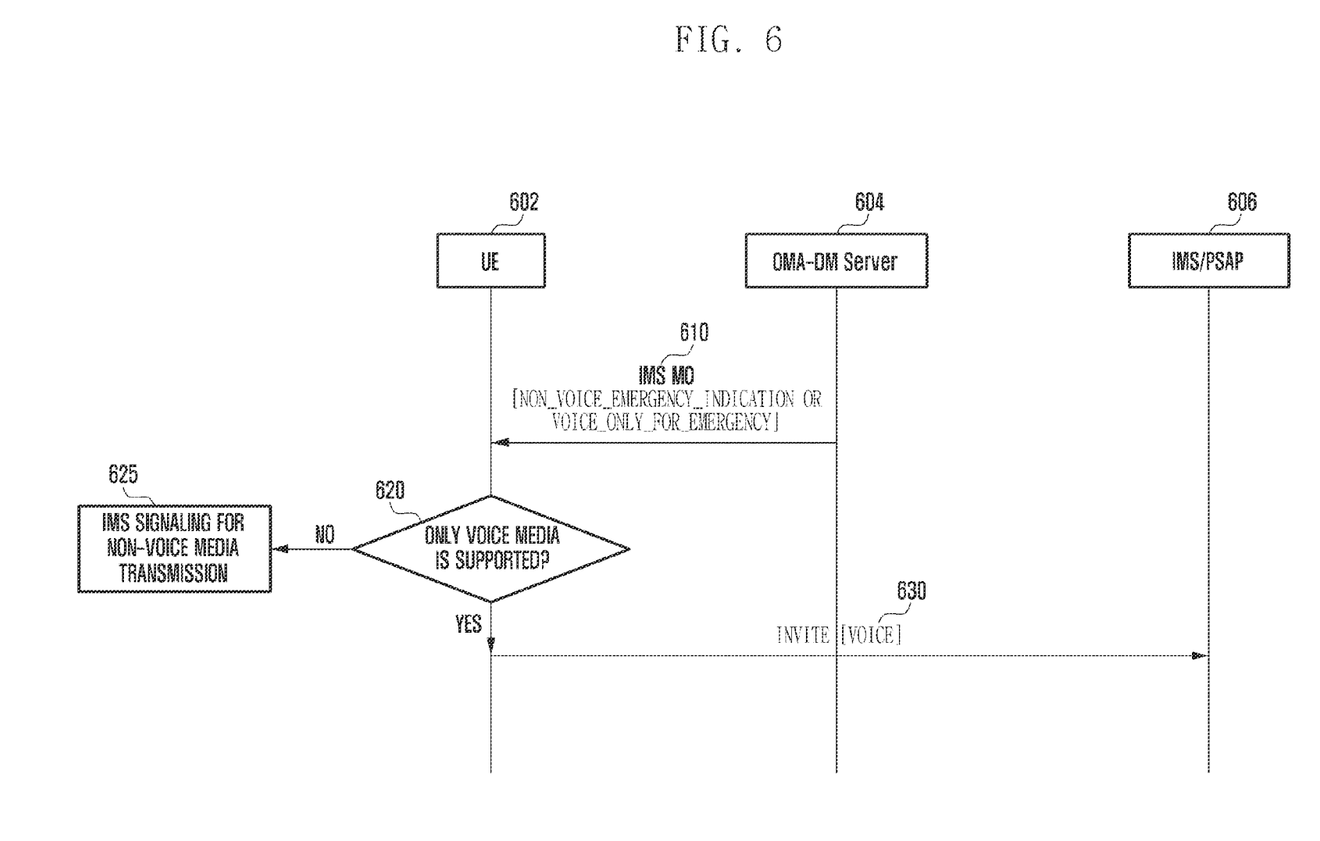
FIG. 6 is a signal flow diagram illustrating a procedure for processing an emergency call of an UE supporting voice media type only according to an exemplary embodiment of the present invention.

FIGS. 5 and 6 are signal flow diagrams illustrating an emergency call establishment procedure for a UE having the IMS MO including Non_voice_emergency_indication or Voice_only_for_emergency leaf according to an exemplary embodiment of the present invention.

FIG. 5 is a signal flow diagram illustrating a procedure for processing a NOVES call of the UE supporting non-voice media type according to an exemplary embodiment of the present invention.

Referring to FIG. 5, if the non-voice media type is supported for emergency call, this means that the Non_voice_emergency_indication is set to on or the Voice_only_for_emergency is set to off.

The UE 502 receives the information including IMS MO configuration from the OMA-DM server 504 at step 510.

The UE 502 is capable of resetting the value of the IMS MO of the UE according to the received IMS MO configuration. According to an exemplary embodiment of the present invention, if the non-voice media type emergency call is used, the Non_voice_emergency_indication can be set to a predetermined value. According to another exemplary embodiment of the present invention, if the voice media type emergency call is used, the Voice_only_for_emergency can be set to a predetermined value. According to an exemplary embodiment of the present invention, the UE 502 may receive the information including the IMS MO configuration from the OMA-DM server 504 when it accesses a communication network. According to another exemplary embodiment of the present invention, the UE 502 is capable of receiving the IMS MO configuration from the OMA-DM server 504 selectively according to the IMS MO configuration value stored in the UE 502 when it attempts initial access to the communication network. According to an exemplary embodiment of the present invention, the information may indicate the media type which the IMS supports.

The UE 502 determines, based on the value received at step 510, whether the non-voice media type is supported for emergency call at step 520. If it is determined that the non-voice media type is not supported at step 520, then the UE 502 performs signaling with voice media at step 525.

If it is determined that the non-voice media type is supported at step 520, then the UE 502 sends an IMS signal including the media type it supports to the IMS/PSAP 506 at step 530. According to an exemplary embodiment of the present invention, the IMS signal can be transmitted in the form of an emergency call request, and the signaling may include the recommendation of all media supported by the UE 502.

The IMS/PSAP 506 sends, at step 540, an IMS signal including the information on the media it supports to the UE 502 in response to the signal received at step 530. According to an exemplary embodiment of the present invention, the PSAP 506 is capable of transmitting the information including the information on all media types it supports through the IMS signaling.

The UE 502 stores the information on the media supported by the PSAP 506 in use of NOVES based on the information acquired at step 540 and displays the PSAP-supported media information to the user at step 550.

According to the user selection or UE setting, the UE 502 establishes a NOVES call session with the PSAP 506 at step 560.

FIG. 6 is a signal flow diagram illustrating a procedure for processing an emergency call of an UE supporting voice media type only according to an exemplary embodiment of the present invention.

Referring to FIG. 6, in the case in which the UE 602 supports non-voice media type as well as the voice media type for emergency call, the Non_voice_emergency_indication is set to off or the Voice_only_for_emergency is set to on. The parameters can be set differently depending on the exemplary embodiment of the present invention.

The UE 602 receives the information including the IMS MO configuration from the OMA-DM server 604 at step 610.

The UE 602 is capable of setting the value of IMS MO stored in the UE 602 based on the information received at step 610. If the Non_voice_emergency_indication is received, the UE 602 sets the corresponding value to off and, if the Voice_only_for_emergency is received, the UE 602 sets the corresponding value to on. The UE 602 is capable of storing the received value. According to an exemplary embodiment of the present invention, the UE 602 is capable of displaying the voice only emergency call capability to the user.

The UE 602 determines, based on the value received at step 610, whether only the voice media type emergency call is supported at step 620. If it is determined that the non-voice media type emergency call is supported, then the UE 602 performs IMS signaling for transmitting non-voice media type signal at step 625.

If it is determined that the voice media type only emergency call is supported, then the UE 602 performs IMS signaling for transmitting voice media type signal at step 630.

According to another exemplary embodiment of the present invention, the UE is capable of storing the IMS MO including the information on the available media types as well as the information on the media type supported by the UE for emergency call and performing the emergency call transmission procedure based on this information.

Figure 7:
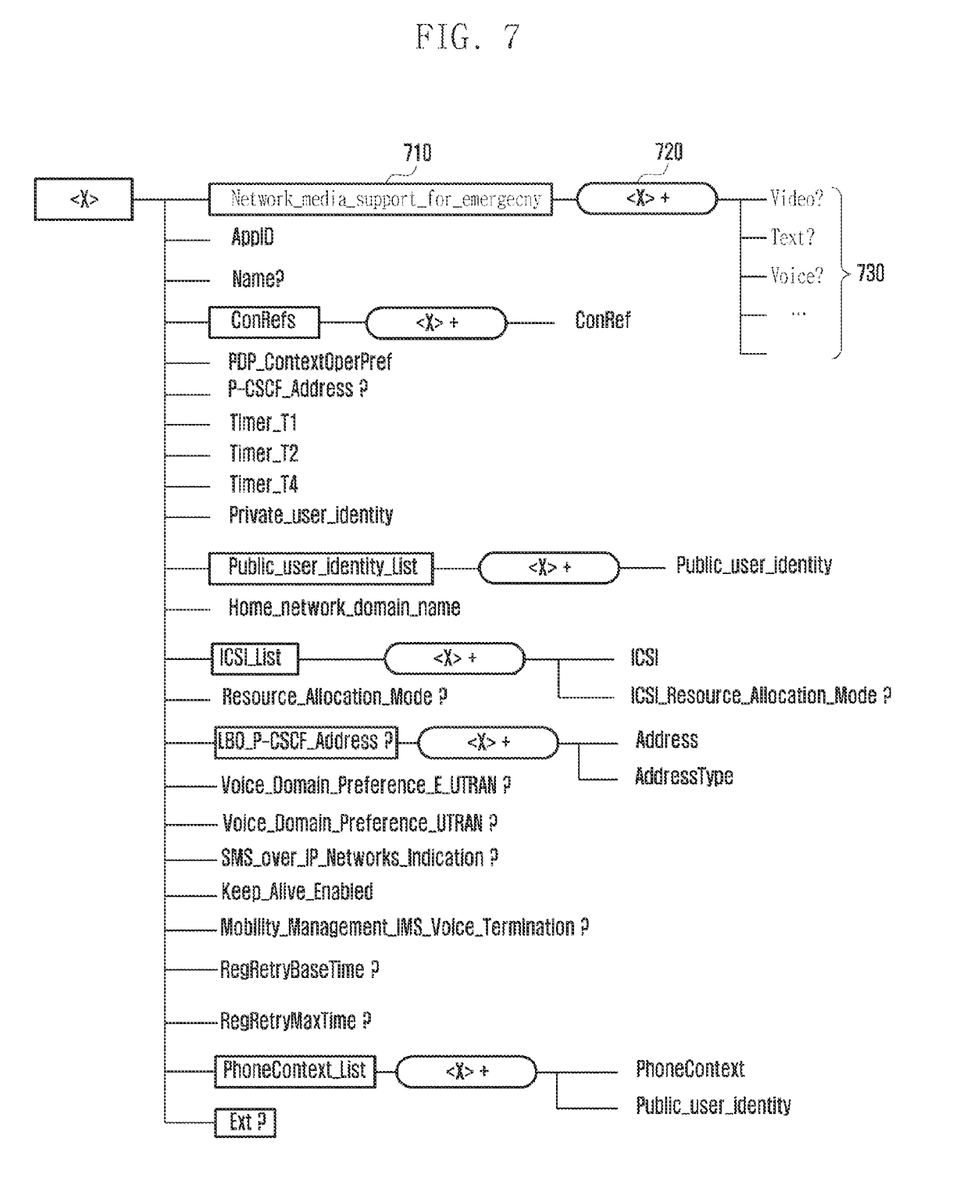
FIG. 7 is a diagram illustrating an architecture of an IMS MO including a leaf indicating an UE capability of voice and non-voice media type emergency call according to an exemplary embodiment of the present invention.

FIG. 7 is a diagram illustrating an architecture of an IMS MO including a leaf indicating an UE capability of voice and non-voice media type emergency call according to an exemplary embodiment of the present invention.

Referring to FIG. 7, the leaf includes network_media_support_for_emergency 710, <X>+720, and media type 730. These elements can be called different names depending on the exemplary embodiment of the present invention.

The media type supported by the network to which the UE has connected can be included in a sub-leaf of the Network_media_support_for-emergency 710. For example, the UE is capable of configuring the emergency call based on the media type 730 included in the sub-leaf of the Network_media_support_for_emergency 710. The sub-leaf is capable of including the available media types 730 including voice, text, video, and the like. According to an exemplary embodiment of the present invention, the media type can be the media type supported by the IMS to which the UE has connected.

In an exemplary embodiment of the present invention, a plurality of indicators corresponding to the respective media types supported in the IMS can be used. For example, it is possible to indicate whether the IMS supports video, text, and voice transmissions using the corresponding indicators.

Figure 8:
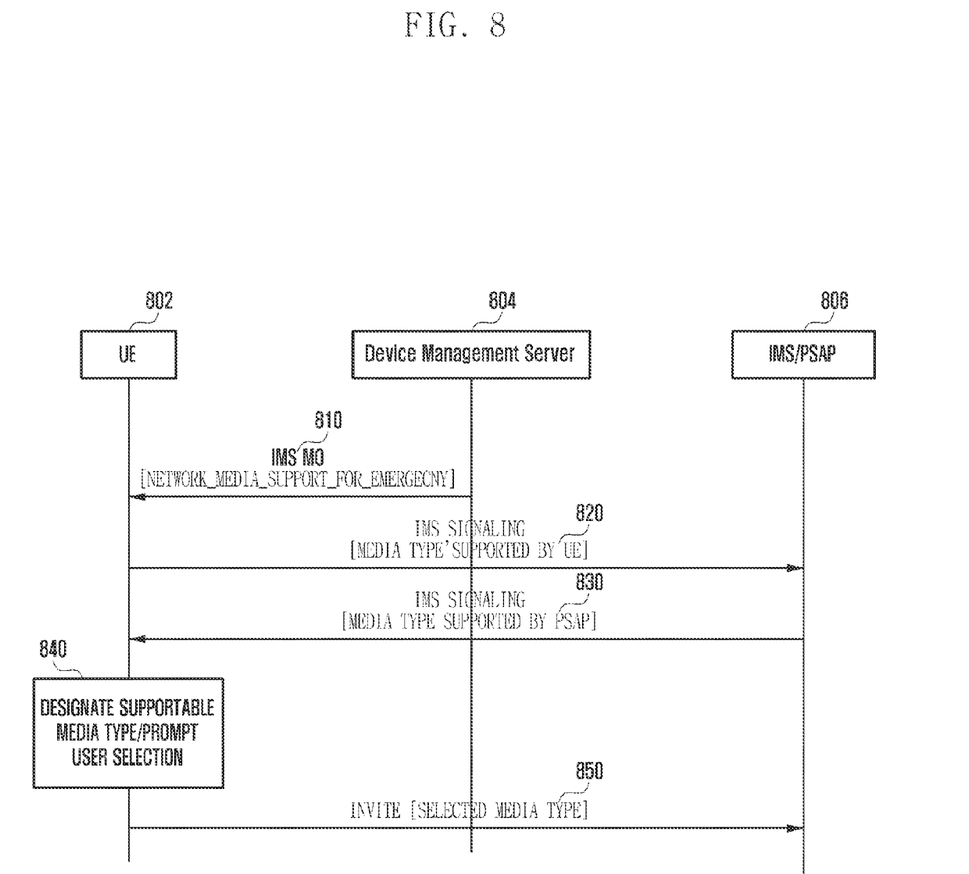
FIG. 8 is a signal flow diagram illustrating a procedure for processing a NOVES call of an UE supporting non-voice media type as well as voice media type according to an exemplary embodiment of the present invention.

FIG. 8 is a signal flow diagram illustrating a procedure for processing a NOVES call of an UE supporting non-voice media type as well as voice media type call according to an exemplary embodiment of the present invention.

Referring to FIG. 8, the UE 802 receives the information including the IMS MO configuration from the OMA-DM server 804 at step 810. This information can include the media types which the UE can use in the corresponding network in the sub-leaf of the Network_media_support_for_emergency and be included in the IMS MO stored in the UE. With this information, the UE is capable of determining the media type for use in the network.

The UE 802 transmits an emergency call request to the PSAP 806 at step 820 through an IMS signal based on the information received at step 810. The IMS signal can include the information on all of the media supported by the UE 802. In more detail, the IMS signal is capable of including the information on all available media that the UE can use. According to an exemplary embodiment of the present invention, the media type to be used can be selected from the set intersection of the media types included in the Network_media_support_for_emergency and the media types supported by the UE 802.

The PSAP sends a signal including the information on the media selected based on the information received at step 820 to the UE 802 at step 830. The UE 802 stores, at step 840, the NOVES media information acquired from the information received at step 830. According to another exemplary embodiment of the present invention, the UE 802 is capable of displaying the stored NOVES media information to the user.

Finally, the UE 802 establishes the NOVES call according to the user selection or the settings of the UE 802 at step 850.

The IMS MO architectures of FIGS. 2, 3, 4, and 7 are exemplary embodiments of the present invention and the invention as such is not restricted to these exemplary embodiments of the present invention but can be modified depending on the exemplary embodiment of the present invention.

It will be understood that various modifications of the present invention can be practiced by those skilled in the art without departing from the scope and spirit of the present invention. Accordingly, it should be understood that the exemplary embodiments of the present invention are described for illustrative purposes only but not limiting the scope of the same in any way. Such alterations and modifications should be construed as equivalent variations or designs made according to the spirit of the present invention and are encompassed by claims.

As described above, the emergency call processing method according to exemplary embodiments of the present invention is capable of notifying the user of the media available for use in emergency call before placing the emergency call. Because the emergency call processing method according to exemplary embodiments of the present invention informs the user of the media supported by the emergency center, it is possible to reduce the emergency call processing delay. Furthermore, the emergency call processing method according to exemplary embodiments of the present invention allows only the terminal capable of NOVES to perform the media information acquisition procedure, thereby avoiding overhead caused by media acquisition attempts of a large number of terminal.

Although exemplary embodiments of the present invention have been described in detail hereinabove with specific terminology, this is for the purpose of describing particular exemplary embodiments of the present invention only and not intended to be limiting of the invention. While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting an emergency call by a terminal, the method comprising:
   receiving, from a server, a first message including information on a media type supported by an internet protocol multimedia subsystem (IMS);
   identifying whether a non-voice media type is supported by the IMS based on the first message;
   transmitting, to a public safety answering point (PSAP), if the non-voice media type is supported by the IMS based on a result of the identification, a second message including information on a media type supported by the terminal, the second message identified based on the first message; and
   transmitting, to the PSAP, if the non-voice media type is not supported by the IMS based on the result of the identification, an invite message to establish a voice emergency call.

2. The method of claim 1, wherein the first message includes an indicator which indicates whether the IMS supports non-voice media.

3. The method of claim 1, wherein the first message comprises at least one indicator which indicates whether the IMS supports the media type corresponding to the at least one indicator.

4. The method of claim 1, further comprising:
   receiving, from the PSAP, a third message including information on a media type supported by the PSAP in response to the second message.

5. The method of claim 4, further comprising:
   selecting at least one media type supported by the PSAP based on the third message; and
   transmitting, to the PSAP, an Invite message based on the selected media type.

6. The method of claim 1, wherein the receiving the first message comprises receiving, from an open mobile alliance-device management (OMA-DM) server, by the terminal, an IMS management object (MO).

7. The method of claim 6, wherein the receiving the first message comprises receiving, if the terminal accesses a service network, the IMS MO selectively according to the IMS MO stored in the terminal.

8. A terminal for transmitting an emergency call, the terminal comprising:
   a transceiver for transmitting and receiving a signal; and
   a controller configured to:
      receive, from a server, a first message including information on a media type supported by an internet protocol multimedia subsystem (IMS),
      identify whether a non-voice media type is supported by the IMS based on the first message,
      transmit, to a public safety answering point (PSAP), if the non-voice media type is supported by the IMS based on a result of the identification, a second message including information on a media type supported by the terminal, the second message identified based on the first message, and
      transmit, to the PSAP, if the non-voice media type is not supported by the IMS based on a result of the identification, an invite message to establish a voice emergency call.

9. The terminal of claim 8, wherein the first message includes an indicator which indicates whether the IMS supports non-voice media.

10. The terminal of claim 8, wherein the first message at least one indicator which indicates whether the IMS supports the media type corresponding to the at least one indicator.

11. The terminal of claim 8, wherein the controller is further configured to receive, from the PSAP, media type supported by the PSAP in response to the second message.

12. The terminal of claim 11, wherein the controller is further configured to select at least one media type supported by the PSAP based on a third message, and to transmit, to the PSAP, an Invite message based on the selected media type.

13. The terminal of claim 8, wherein the controller is further configured to receive, from an open mobile alliance-device management (OMA-DM) server, an IMS management object (MO).

14. The terminal of claim 13, wherein the controller is further configured to receive, if the terminal accesses a service network, the IMS MO selectively according to the IMS MO stored in the terminal.

15. A method for transmitting an emergency call of a terminal, the method comprising:
   receiving, from a server, by the terminal, information on a media type supported by an internet protocol multimedia subsystem (IMS);
   identifying, by the terminal, based on the information received from the server, whether a non-voice media type is supported for an emergency call; and
   transmitting, by the terminal to a public safety answering point (PSAP), a signal including an indication as to at least one media type that the terminal supports if the non-voice media type is supported by the IMS based on a result of the identification, and a second message including information on a media type supported by the terminal; and
   transmitting, by the terminal to the PSAP, if the non-voice media type is not supported by the IMS based on the result of the identification, an invite message to establish a voice emergency call,
   wherein a non-voice media type used to transmit the emergency call is determined based on the information received from the server.

16. The method of claim 15, further comprising:
   transmitting, by the terminal, the emergency call using a non-voice media type if it is identified that non-voice media types are supported for emergency calls.

17. The method of claim 15, further comprising:
   receiving, by the terminal from the PSAP, a signal that includes an indication as to at least one media type that the PSAP supports.

\* \* \* \* \*